United States Patent
Sharp

[11] 3,888,548
[45] June 10, 1975

[54] ANTI-LOCK VEHICLE BRAKE SYSTEM

[75] Inventor: Denis Sharp, Salford, near Redhill, England

[73] Assignee: U.S. Philips Corporation, New York, N.Y.

[22] Filed: July 18, 1972

[21] Appl. No.: 272,776

[30] Foreign Application Priority Data
July 27, 1971 United Kingdom............. 35321/71

[52] U.S. Cl............................. 303/21 CG; 188/181 A
[51] Int. Cl............................................. B60k 8/12
[58] Field of Search...... 188/181 A; 303/20, 21 AU; 324/162; 340/52 R, 53, 262; 307/10 R; 317/5

[56] References Cited
UNITED STATES PATENTS

| | | | |
|---|---|---|---|
| 3,398,995 | 8/1968 | Martin | 303/21 BE |
| 3,467,444 | 9/1969 | Lieber | 303/21 B |
| 3,525,553 | 8/1970 | Carp et al | 303/21 P |
| 3,547,501 | 12/1970 | Harned et al | 303/21 BE |
| 3,556,610 | 1/1971 | Leiber | 303/21 P |
| 3,604,762 | 9/1971 | Ando et al | 303/21 BE |
| 3,606,490 | 9/1971 | Ando | 303/21 BE |
| 3,652,133 | 3/1972 | Yamazaki et al | 303/21 CG |
| 3,677,609 | 7/1972 | Davis et al | 303/21 BE |
| 3,690,735 | 9/1972 | Arai et al | 303/21 P |
| 3,717,384 | 2/1973 | Harned | 303/21 BE |

*Primary Examiner*—Trygve M. Blix
*Assistant Examiner*—Stephen G. Kunin
*Attorney, Agent, or Firm*—Frank R. Trifari

[57] ABSTRACT

In order to adapt an anti-lock brake system to the condition of the road surface, which may be dry or slippery, in an electronic control circuit the reference value for the rate of change of the wheel speed of a braked wheel, i.e., the deceleration and the acceleration, is varied in time from a fixed initial value for deceleration to a given acceleration value. This variation is made operative, as soon as the solenoid of the valve mechanism in the hydraulic brake connection is energized by the control circuit. As the case may be, a fixed time delay before the variation occurs may be built in. Steps are also taken to suppress effects of noise pulses and oscillations in the wheel suspension, and in the case of a very slippery road surface the control circuit is reset after a given time.

12 Claims, 8 Drawing Figures

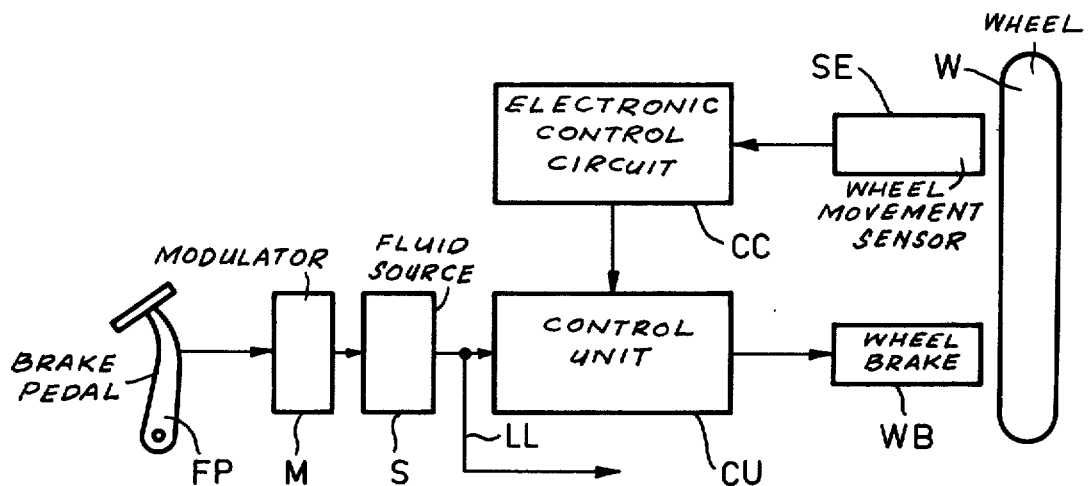
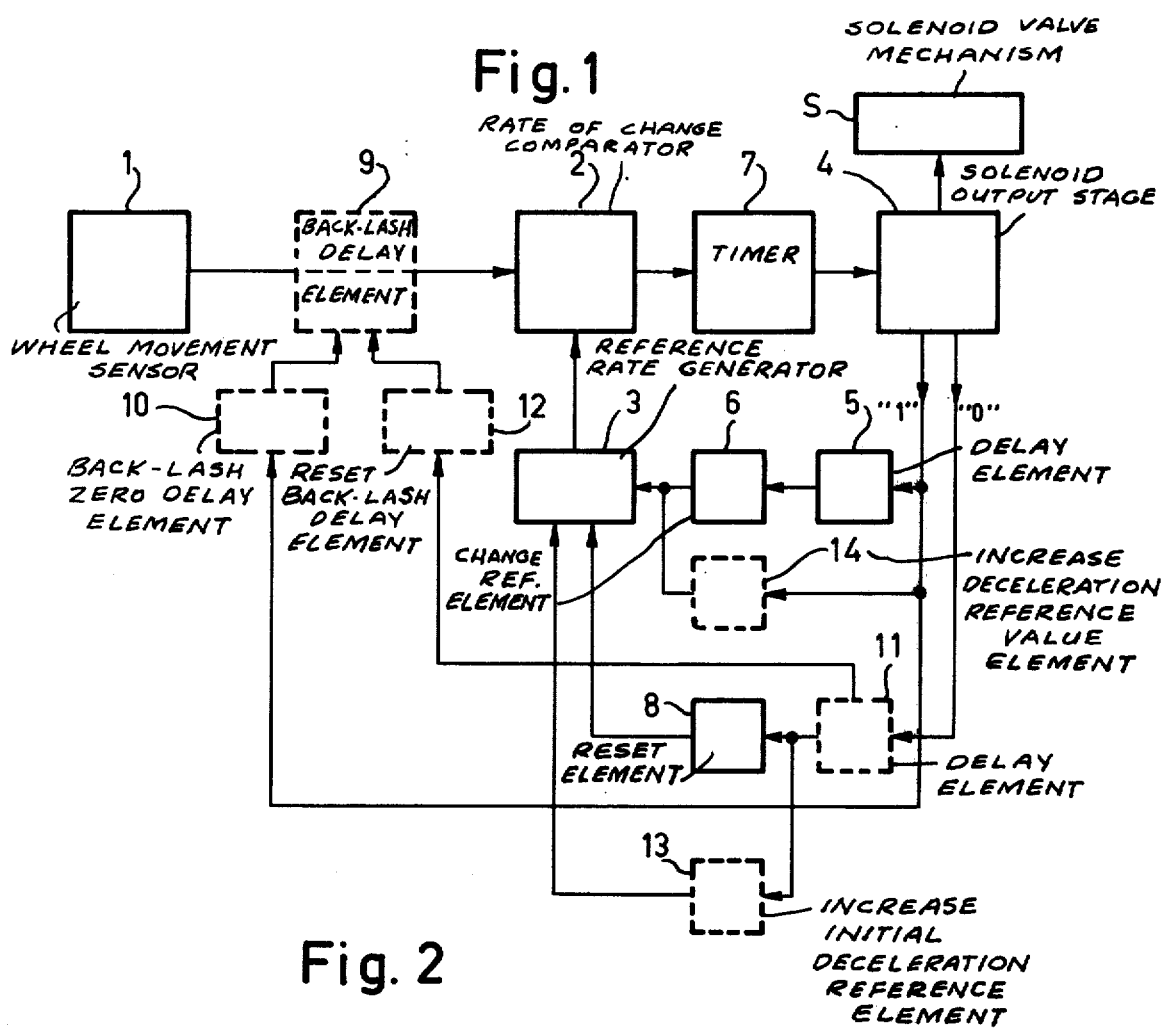
Fig. 1
Fig. 2

ANTI-LOCK VEHICLE BRAKE SYSTEM

This invention relates to anti-lock brake systems for wheeled vehicles, that is, brake systems including means for improving brake performance of a vehicle by relieving braking pressure applied to a road wheel of the vehicle, if the wheel tends to lock following brake application, and then increasing the braking pressure again without the need for any change in the actual braking action (by a person using the brake) causing the brake application. Such brake systems can be successful in reducing the risk of skidding due to wheel lock and in maintaining directional control during braking, and can also reduce braking distances.

When brake application takes place, braking force due to type adhesion with the road quickly reaches a peak value and then reduces over an unstable region prior to the wheel locking. The aim of an anti-lock brake system in respect of each wheel controlled by it, is to detect when wheel locking is imminent before it actually occurs, and to modulate braking pressure to keep the wheel turning at the point of maximum adhesion between the tire and the road.

Many anti-lock brake systems have been proposed; some simple and others complex. Those operating on rear wheels only of a vehicle are usually simple, and this is admissible partly because weight transfer to the front wheels during braking makes rear wheel braking less important, and partly because the extra inertia of the vehicle transmission (in the case of rear wheel drive) assists the anti-lock control action in normal circumstances. A simple system is rarely adequate when used on front wheels of a vehicle. In this case, the anti-lock braking control has to very accurate in order that locked wheel stopping distances of a vehicle on a good surface are not shorter than those achieved when under anti-lock braking control. Thus, a complex system is usually necessary in this case, and also in the case where the system operates on each road wheel of a vehicle individually.

Some anti-lock brake systems which have been proposed are wholly mechanical and use an inertia sensor for detecting when wheel deceleration due, to wheel slip caused by an excessive braking force, is likely to cause wheel locking. Upon detecting such a condition, the inertia sensor acts to reduce the braking force, for instance by opening a relief valve to reduce fluid pressure which is producing the braking force. Other anti-lock brake systems use electronic control circuits for detecting when wheel locking is imminent, due to excessive wheel deceleration, and actuate a solenoid valve to reduce fluid pressure at the brake. It is with these latter anti-lock brake systems that the present invention is particularly concerned.

A known electronic control circuit for detecting when wheel locking is imminent is responsive to an alternating electrical signal of frequency proportional to rotational speed of the wheel to produce a d.c. signal the instantaneous magnitude of which represents wheel speed. When the rate of change of wheel speed (deceleration) exceeds a certain reference value, the consequential rate of change of magnitude of the d.c. signal causes the control circuit to energize a solenoid valve mechanism to reduce braking pressure, thereby allowing the wheel to accelerate. When the accelerating wheel has reached what may be termed the "reference speed" (i.e., the speed the wheel would have attained, if it had continued to decelerate at said certain reference value from the speed it was doing when braking pressure was reduced), the control circuit responds to the magnitude of the d.c. signal then obtaining, to de-energize the solenoid valve mechanism to allow braking pressure to be increased again.

With this known electronic control circuit, the wheel tends to "go down the reference"; that is, since braking pressure is increased when wheel deceleration is above the reference value of deceleration, and is reduced when wheel deceleration is below this value, the wheel tends to decelerate at the reference value. This reference value is chosen so that normal braking is unaffected by anti-lock control, and for this reason the reference value of deceleration must be higher than that theoretically possible for a vehicle with locked wheels on a good surface. If the wheel goes down the reference when the vehicle is on a good surface, the result may not be too serious, and the wheel would lock a few feet before the vehicle came to rest. However, if the vehicle were on ice, if the wheel went down the same reference, it would lock during the first tenth of the stopping distance, and this would not be acceptable.

There are two methods of avoiding this trouble. The first method utilizes a defect which is normally very difficult to avoid, and relies on the braking pressure falling to too low a value when the solenoid valve mechanism is energized. This "overmodulation" of the braking pressure allows the wheel to accelerate faster than normal, and it will overshoot the reference speed. The second method requires a control of the rate of braking pressure increase, when the solenoid valve mechanism is de-energized. This again allows the wheel to accelerate to a speed above the reference speed. Therefore, in each instance, a following anti-lock control action is initiated at a (safe) wheel speed, which is higher than the reference speed. Unfortunately, both these methods increase the stopping distance when on a good surface.

According to the present invention there is provided for an anti-lock vehicle brake system, an electronic control circuit which is operable to energize a solenoid valve mechanism of the system to reduce braking pressure in response to wheel deceleration being in excess of a reference value, and is further operable, following energization of the solenoid valve mechanism, to vary said reference value progressively in a positive sense, and to hold the solenoid valve mechanism energized until the rate of change of wheel speed attains a particular relationship with the varying reference value. The control circuit is in its operation responsive to an input signal which varies as a function of the rate of change of the wheel speed.

With an electronic control circuit according to the invention, the effect of the progressively varying reference value of wheel deceleration is to increase the duration for which the solenoid valve mechanism is held energized as a function of the time it takes the rate of change of wheel speed to "catch" the progressively varying reference value. On a good surface (i.e., a surface affording a high coefficient of friction ($\mu$) between itself and a vehicle wheel) the wheel will recover quickly (from its tendency to decelerate to a locked condition) so that the solenoid valve mechanism will be held energized for only a short duration, whereas the wheel will take longer to recover on surfaces affording lower $\mu$ values. On slippery surfaces (low $\mu$), the wheel can take so long to recover, that the progressively varying reference value may pass through zero and become an acceleration reference value so that the solenoid valve mechanism is not de-energized until the wheel is actually accelerating.

In carrying out the invention, the electronic control circuit is preferably arranged not to energize the solenoid valve mechanism, (to initiate an anti-lock braking control action) until wheel speed has decreased by more than a predetermined amount, at a rate in excess of the reference value of wheel deceleration. In this way, spurious response of the electronic control circuit due to momentary decreases of wheel speed, as may be produced by "whipping" in a vehicle suspension, can be avoided.

The characteristics are such, that a small reduction of braking pressure will free a wheel when nearly locked on a good surface. Taking into account the delays of the mechanics of an anti-lock brake system, this means that a short energization of the solenoid valve mechanism is adequate. On good surfaces (high $\mu$) therefore, the solenoid valve mechanism must be turned off as soon as possible to avoid overmodulation of braking pressure.

It is therefore preferable, that an electronic control circuit according to the invention is further arranged to maintain the reference value of wheel deceleration unchanged for a short period immediately after the solenoid valve mechanism has been energized and to cause de-energization of the solenoid valve mechanism, if wheel deceleration no longer exceeds said reference value during said period. The control circuit causes said reference value to vary progressively in a positive sense at the end of said period only if wheel deceleration still exceeds said reference value.

As an alternative, with a view to obtaining even shorter durations of energization of the solenoid valve mechanism within said short periods, the control circuit can be adapted to increase said reference value of wheel deceleration to a new, more negative, value immediately after the solenoid valve mechanism has been energized and for the duration of said short period, and to cause de-energization of the solenoid valve mechanism, if wheel deceleration no longer exceeds the new reference value during said period. The control circuit causes said reference value to vary progressively from said new reference value in a positive sense at the end of said period only if wheel deceleration still exceeds the new reference value.

When an anti-lock braking control action on a wheel ceases, it sometimes happens that the vehicle suspension can be excited into a resonance. As a result, the wheel appears to overshoot the vehicle speed and then decelerate rapidly back to its current speed as the oscillation is damped out. This apparent rapid deceleration can cause a new anti-lock braking control action to be started at a time when it is not required. Also, it is so phased as to cause the oscillation to be sustained for some time, causing the braking pressure applied to the wheel to be reduced unnecessarily.

To prevent the above from happening, an electronic control circuit according to the invention is preferably further arranged such that, when an anti-lock braking control action ceases, it sets said reference value for a short period to a higher deceleration rate than the original rate at the start of the anti-lock braking control action, before resetting said reference value to the original rate. This short period is so chosen as to allow the aforementioned oscillations to decay to a negligible value, before said reference value is reset to the original rate.

An alternative to increasing the deceleration value temporarily for the purpose aforesaid, is to arrange the control circuit so that the acceleration response to the input signal is reduced for a short time at the end of an anti-lock braking control action. However, this latter method is not so effective at low wheel speeds, because of the lower information content of the input signal at low wheel speeds.

If an anti-lock braking control action is not terminated by the control circuit, because conditions are such that rate of change of wheel speed cannot attain said particular relationship with the progressively varying reference value, then it would continue indefinitely. To prevent this happening, the control circuit can include a timer which automatically ends the anti-lock braking control action after a pre-set time. Preferably, such a timer is included adjacent the output stage of the control circuit, so that should a fault develop in a preceding stage of the control circuit, the solenoid valve mechanism will not be held energized permanently.

Suitably, the input signal to an electronic control circuit according to the invention, is derived from a train of pulses produced by a transducer which is so arranged, that the frequency of the pulse train is a function of the speed of rotation of a wheel to be controlled by an anti-lock brake system embodying the circuit. However, the input signal may be derived directly from an accelerometer associated with a wheel to be controlled.

It is envisaged that an electronic control circuit according to the invention, will be suitable for inclusion in a variety of anti-lock vehicle brake systems, with time delays and reference values, where appropriate, being adjusted to allow for variations in mechanical response.

For example, the electronic control circuit can be included in an anti-lock vehicle brake system comprising, a vehicle wheel and associated wheel brake, and a fluid pressure source, which in response to a braking action, provides fluid under pressure via a fluid pressure connection to the brake. The fluid under pressure is effective to cause the brake to produce braking pressure at said wheel. A solenoid valve mechanism, and a control circuit responsive to an electrical input from a wheel movement sensor is provided to produce an electrical output to energize said solenoid valve mechanism, when wheel deceleration exceeds a reference value. A relief connection interconnected with said fluid pressure connection, or with the brake, is opened by said solenoid valve mechanism, when the latter is energized, to allow displacement of fluid from said fluid pressure connection, or from the brake, into said relief connection, whereby to cause a reduction in the pressure of such fluid and thereby relieve braking pressure.

An anti-lock vehicle brake system of the above character may be either of the master cylinder type in which fluid in a master cylinder is pressurized by a piston when a braking action takes place, to pressurize fluid in said fluid pressure connection, or of the continuously pumped type in which fluid under pressure is available continuously in the brake system, and is "modulated" by a braking action such that the pressurized fluid is applied through said fluid pressure connection to the brake to an extent determined by the extent of modulation. Also, the braking action may be with or without servo or amplifier assistance.

In order that the invention may be more fully understood, reference will now be made by way of example to the accompanying drawings of which:

FIG. 1 is a diagrammatic general layout for an anti-lock vehicle brake system;

FIG. 2 is a logic diagram of an electronic control circuit according to the invention;

Figure 3:
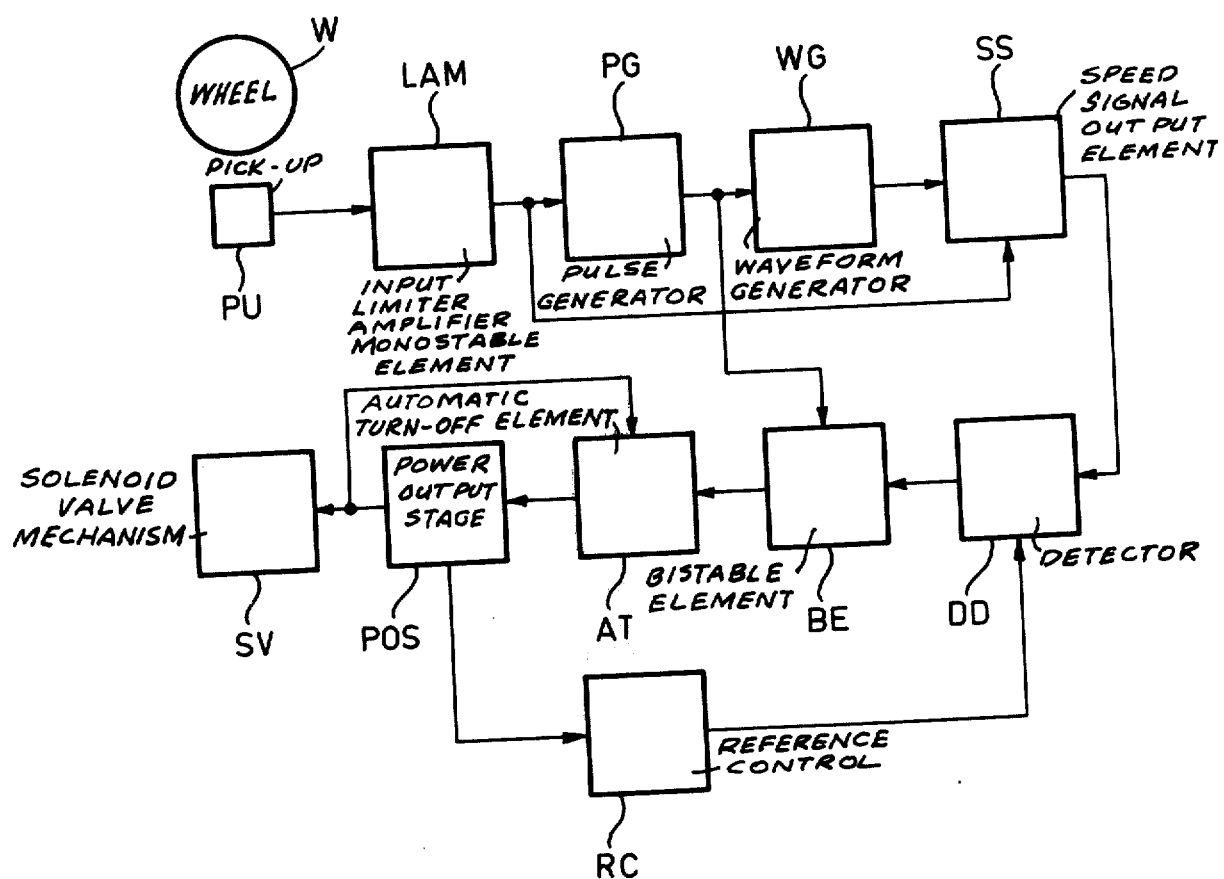
FIG. 3 is a block diagram of an electronic control circuit which can function according to the logic diagram of FIG. 2.

FIGS. 5, 6a, 6b, and 6c, show explanatory waveform diagrams.

Referring to the drawings, the general layout for an anti-lock vehicle brake system in FIG. 1, shows a brake pedal FP for actuating a braking pressure modulator M, which controls the application of fluid pressure from a fluid pressure source S of the system to a wheel brake WB. An anti-lock control unit CU is provided between the fluid pressure source S and the brake WB. A wheel movement sensor SE supplies an electrical signal, related to rotational movement of a wheel W, for which the brake WB is provided, to an electronic control circuit CC.. This electrical signal can be derived directly by the sensor SE to vary as a function of rate of change of wheel speed, or the electrical signal can be derived (e.g., a train of pulses) to be proportional to wheel speed. This signal is converted by an input stage of the electronic control circuit to an effective input signal which varies as a function of rate of change of wheel speed. The anti-lock control unit CU would include a solenoid valve mechanism which is energized by an electrical output from the electronic control circuit CC, when wheel deceleration is in excess of a reference value, to cause braking pressure applied to the wheel brake WB to be relieved. In the present instance, the control circuit CC is assumed to be in accordance with the invention, and its further operation to terminate the anti-lock braking control action will be dealt with hereinafter.

As indicated by the lead LL, separate systems as shown in FIG. 1 (with a common fluid pressure source) can be provided in respect of each road wheel of a vehicle, but it would also be possible to provide a single system for two (rear) wheels driven by a vehicle transmission shaft. A sensor is associated with the shaft, for producing the electrical signal related to wheel rotational movement. As another alternative, a single anti-lock control unit with its solenoid valve mechanism, may be provided in common for all the road wheels of a vehicle. In this case, each road wheel would have its own wheel movement sensor and associated electronic control circuit, and any of the latter would provide an electrical output to energize the solenoid valve mechanism when the appertaining wheel tends towards a locked condition.

Turning now to FIG. 2, in the logic diagram of an electronic control circuit there shown, the basic logic elements are represented by full line blocks, and subsidiary logic elements, which provide safeguards against "noise pulses," are represented by broken line blocks. The logic functions performed by the control circuit represented by the logic diagram of FIG. 2 will now be considered in conjunction with the waveform diagrams of FIG. 5.

The control circuit is responsive for its operation to an input signal which varies as a function of rate of change of wheel speed. This input signal is supplied by a wheel movement sensor (or a sensor plus circuitry as aforesaid) represented by the block 1, and is applied in the control circuit to a "rate of change comparator" 2. A "reference rate of change generator" 3 applies to the comparator 2 a signal representing a reference value of wheel deceleration, and the comparator 3 causes a "solenoid output stage" 4 to produce an electrical output for energizing a solenoid valve mechanisms, of an anti-lock vehicle brake system. With the control circuit as so far described, the comparator 3 causes the stage 4 to terminate its output, (to de-energize the solenoid valve mechansim) when wheel deceleration no longer exceeds the reference value. During the time that the solenoid valve mechanism is energized a wheel being controlled by the system will recover from its tendency to decelerate to a locked condition. The wheel will recover very quickly when on a good surface, and the solenoid valve mechanism will be de-enegized within a short period of time from its energization. FIG. 5a shows typical curves of wheel speed against time and curve (a) represents good surface conditions. The slope r represents the reference value of wheel deceleration at which the solenoid valve mechanism is energized and slope r' (which is the same slope but later in time) represents the recurrence of the reference value of wheel deceleration at which the solenoid valve mechanism is de-energized. The shortness of the period (ta-FIG. 5b) of solenoid energization enables a good surface to be recognized, since a poor surface would not allow the wheel to recover so quickly, and the period of solenoid energization would be longer. This longer energization provides the control circuit with information that the surface is not a good one, and that the control logic which was safe for a good surface muct be modified to give longer solenoid energization so that the wheel can recover to a safe speed despite the poor surface. For this purpose, the control circuit comprises a "delay element" 5 FIG. 2 which is activated by an "ON" signal from the stage 4, when the latter produces its solenoid energization output, to determine a fixed period tb (FIG. 5c) within which the solenoid valve mechanism can be de-energized, when wheel deceleration no longer exceeds the reference value. This fixed period tb is chosen, having regard to the mechanisms of an anti-lock vehicle brake system, so as to give sufficient time for a wheel being braked on a good surface to recover from its tendency to decelerate to a locked condition, once an anti-lock braking control action has been initiated by the control circuit to relieve braking pressure at the wheel.

If this fixed period tb is exceeded, the delay element 5 activates a "change reference deceleration rate" element 6 which causes the generator 3 to progressively vary the reference value of deceleration in a positive sense. The curve in FIG. 5c represents a second order function or rate of change of the reference value against time, from which it can be seen that the reference value changes at a substantially linear rate from the end of the fixed period tb until it represents zero deceleration after time tc. Thereafter, the rate of change becomes exponential and changes to an acceleration reference value. It is to be expressed that the slope of the reference value need not be the actual slope shown in FIG. 5c, but in practice would be chosen to suit the mechanics of an anti-lock vehicle brake system, as was the fixed period tb.

The curve (b) in FIG. 5a represents wheel recovery on an intermediate surface, and shows that the wheel has recovered to a point where it is almost accelerating at time c when the reference value represents zero deceleration. In other words, the rate of change of wheel speed has, in effect, "caught" the progressively varying reference value, and when this condition is reached, the comparator 2 causes the stage 4 to de-energize the solenoid valve mechanism. In this instance, the period of solenoid energization is represented by the time period tc. If at time c the wheel is still decelerating, as shown by the curve (c) in FIG. 5a which represents wheel recovery on a more slippery surface, the wheel must accelerate until it "catches" the reference value at time d before solenoid de-energization can occur. The period of solenoid energization is represented in this instance by the time td. If wheel acceleration fails to "catch" the reference value after a predetermined time te, this indicates an extremely slippery surface, (curve (d)-FIG. 5a) and solenoid de-energization is after time te. This is the maximum permitted period of solenoid energization because it is clear that the surface is too slippery to be dealt with by an anti-lock braking control action, and braking control is reverted to the driver. A "timer" 7 in the control circuit is set each time the comparator 2 activates the output stage 4, and acts to turn off this output stage 4 at time e.

When the output stage 4 is turned off to terminate an anti-lock braking control action, an "OFF" signal therefrom activates a "reset element" 8, which resets the generator 3 to initial deceleration reference value.

The control circuit preferably also includes certain safeguards to ensure that "noise" pulses do not make an unwanted change to the logic operation during an anti-lock braking control action. Momentary decreases of wheel speed in excess of the initial deceleration reference value due to "whipping" in a vehicle suspension, give rise to noise pulses in the input signal to which the control circuit could respond. This source of noise pulses is commonly referred to as "black-lash," and its effect can be overcome by including in the control circuit a "back-lash delay element" 9, which affords a time delay that is an inverse function of deceleration. This delay has the effect of ensuring that the comparator 2 does not receive the input signal until wheel speed has decreased by more than a predetermined amount, at a rate in excess of the initial deceleration reference value. This delay element 9 also serves a secondary purpose of allowing a braked wheel to reach higher stop values where peak braking is available, without initiating an anti-lock braking control action.

However, the inclusion of the delay element 9 has the drawback that it could also delay solenoid-energization at the end of an anti-lock braking control action. To overcome this drawback, the control ciircuit includes a "set back-lash delay to zero" element 10, which is responsive to the "ON" signal from the output stage 4. It is also necessary that the back-lash delay should remain at zero for a short time following solenoid de-energization, in case a noise pulse initiated this de-energization, so that solenoid re-energization will occur at the end of the noise pulse without the back-lash delay. To achieve this, the control circuit includes a delay element 11 through which the "OFF" signal from the output stage 4 is applied to a "reset back-lash delay element" 12.

The "OFF" signal from the output stage 4 is also preferably delayed by the delay element 11 before activating the "reset element" 8. This delay prevents the reference value from being reset immediately, if solenoid de-energization occurs due to a noise pulse, so that solenoid re-energization can take place quickly when the noise pulse ceases. The effect on the deceleration reference value of noise pulses, causing solenoid energization, is also nullified by the delay element 5, in that this delay element, in addition to determining the fixed deceleration period tb, prevents noise pulses of short duration from modifying the reference value in a positive sense.

When an anti-lock braking control action ceases, the deceleration reference value can be reset to its initial value as aforesaid, unless vehicle suspension oscillations are likely to cause an articifially high wheel deceleration following renewed brake application. These artificially high wheel decelerations can be accommodated without the control circuit initiating a further anti-lock braking control action in respect of them, if the initial reference value is increased for a certain time until they have ceased. This can be accomplished by including in the control circuit an "increase initial deceleration reference element" 13, which acts on the generator 3 to this effect at time e, (FIG. 5c) until the latter is reset by the element 8 after time tf.

The control circuit may further include an "increase deceleration reference value element" 14, which is activated by the "ON" signal from the output stage 4 to cause the generator 3 to increase the reference value to a new, more negative, value during the period tb (FIG. 5c). This would have the effect of achieving even shorter durations of solenoid energization in good surfaces.

Consider now a circuit which is capable of fulfilling the logic requirements of the logic diagram of FIG. 2.

These requirements could be satisfied using conventional circuit techniques, if an electrical quantity could be obtained which representd the wheel speed, and changed its value smoothly when following changes in wheel speed.

In practice, it is usual to derive such as an electrical quantity from a train of pulses whose frequency is arranged to be proportional to the speed of rotation of the wheel. One method of obtaining such a train of pulses is to mount a toothed steel ring on the wheel, so that it rotates next to a magnetic transducer. A voltage is generated in the transducer whose frequency is proportional to the speed of rotation of the wheel.

Thus any electrical quantity derived from the above train of pulses will change its value in a series of steps. Any attempt to differentiate such an electrical quantity by conventional techniques to produce a rate of change signal which the logic requires, will simply result in a series of pulses whose amplitude and duration bear little relationship to the actual rate of change of the wheel speed.

If the electrical quantity is filtered to remove the steps, then the response of the electrical quantity to rapid change in speed will be reduced. In an extreme case, the response of the electrical quantity could be slower than the rate a differentiator is trying to detect.

One solution to this problem, is to increase the pulse frequency for a given speed so that a shorter time constant filter can be used. This means that the wheel mounted transducer must be more complex. In particular, the number of teeth on the toothed ring must be increased, which makes it very difficult to obtain sufficient output from the magnetic transducer due to the necessity of having a very small airgap between the transducer and the toothed ring. The circuit about to be described allows a sophisticated performance to be obtained, when using a relatively simple pickup (i.e., magnetic transducer and toothed ring), to fulfil the aforesaid logic requirements.

A block diagram of the circuit is shown in FIG. 3. A pickup PU produces a train of pulses whose frequency is proportional to the speed of rotation of a wheel W. This train of pulses is applied to an "input limiter/amplifier and monostable element" LAM. The function of the element LAM is to amplify and limit the train of pulses from the pick-up PU, to produce a train of pulses of substantially constant width (approx. 200 μ sec), having the input pulse frequency, over a frequency range 50 Hz to 1 kHz. The output from the element LAM is applied to a "pulse generator" PG, whose function is to produce an output pulse immediately after each pulse received from the element LAM. The output pulses from the pulse generator PG are arranged to have a duration of 1 ms so that, at or above the normal maximum input frequency of 1 kHz, the output from the pulse generator PG is a constant voltage equal to the normal pulse amplitude. A "waveform generator" WG receives the output from the pulse generator PG, and is responsive to shape each 1 ms pulse therefrom so that it is of a form suitable for a "speed signal output element" SS. The generator WG is arranged so that an output voltage therefrom, just before the next 1 mm pulse applied to it, is a function of the time since the last 1 ms pulse. The element SS effectively samples and holds the output voltage from the generator WG just before the latter is reset. Thus, the output from the element SS is a voltage whose value is a function of the input pulse frequency from the pick-up PU. The elements LAM, WG and SS, therefore, constitute a frequency-to-d.c. converter, and the voltage output from the element SS changes its value in a series of steps when the input pulse frequency changes, and is capable of a very fast response to changes in wheel speed.

The output (or speed signal) voltage from the element SS is applied to a "detector element" DD, which differentiates this speed signal voltage and produces a train of output pulses whenever the speed signal voltage changes its value at a rate in excess of a reference rate. This is fed into the detector DD from a "reference control" element RC. The train of output pulses from the detector DD are applied to a "bistable element" BE, which is also fed with the 1 ms pulses from the generator PG. This bistable element BE is arranged to produce a constant output capable of turning on a "power output stage" POS, whenever the detector DD produces a train of pulses. The pulses from the generator PG are continually attempting to reset the bistable element BE to terminate its output, and will do so each time the pulses from the detector DD cease.

When the stage POS is turned on, its output energizes a "solenoid valve mechanism" SV. This output also activates an "automatic turn-off element" AT, which will turn off the stage POS after a pre-set time, independently of the output from the bistable element BE. Another output produced from the stage POS, when the latter is turned on, is applied to the element RC to modify the reference rate fed into the detector DD. The element RC is arranged to modify the reference rate in the manner shown in FIG. 5c, as previously described. As will be described next with reference to FIG. 4, the various safeguard delays included in the logic diagram, as described with reference to FIG. 2, can be included in different ones of the control circuit elements where appropriate. For example, the back-lash delay (9 - FIG. 2) is suitably built into the circuit of the detector element DD.

Figure 4:
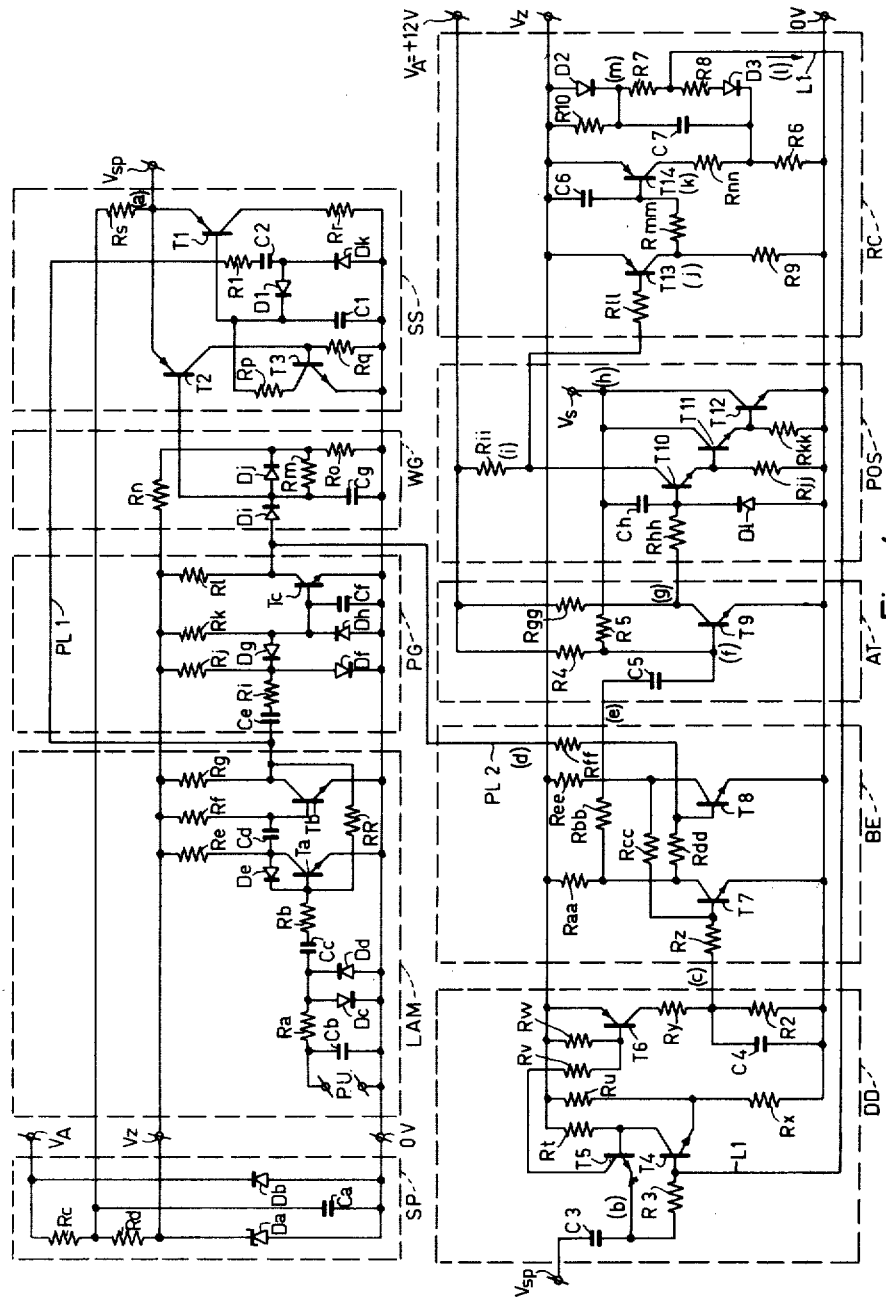
FIG. 4 is a circuit diagram for the block diagram of FIG. 3.
Figure 5:
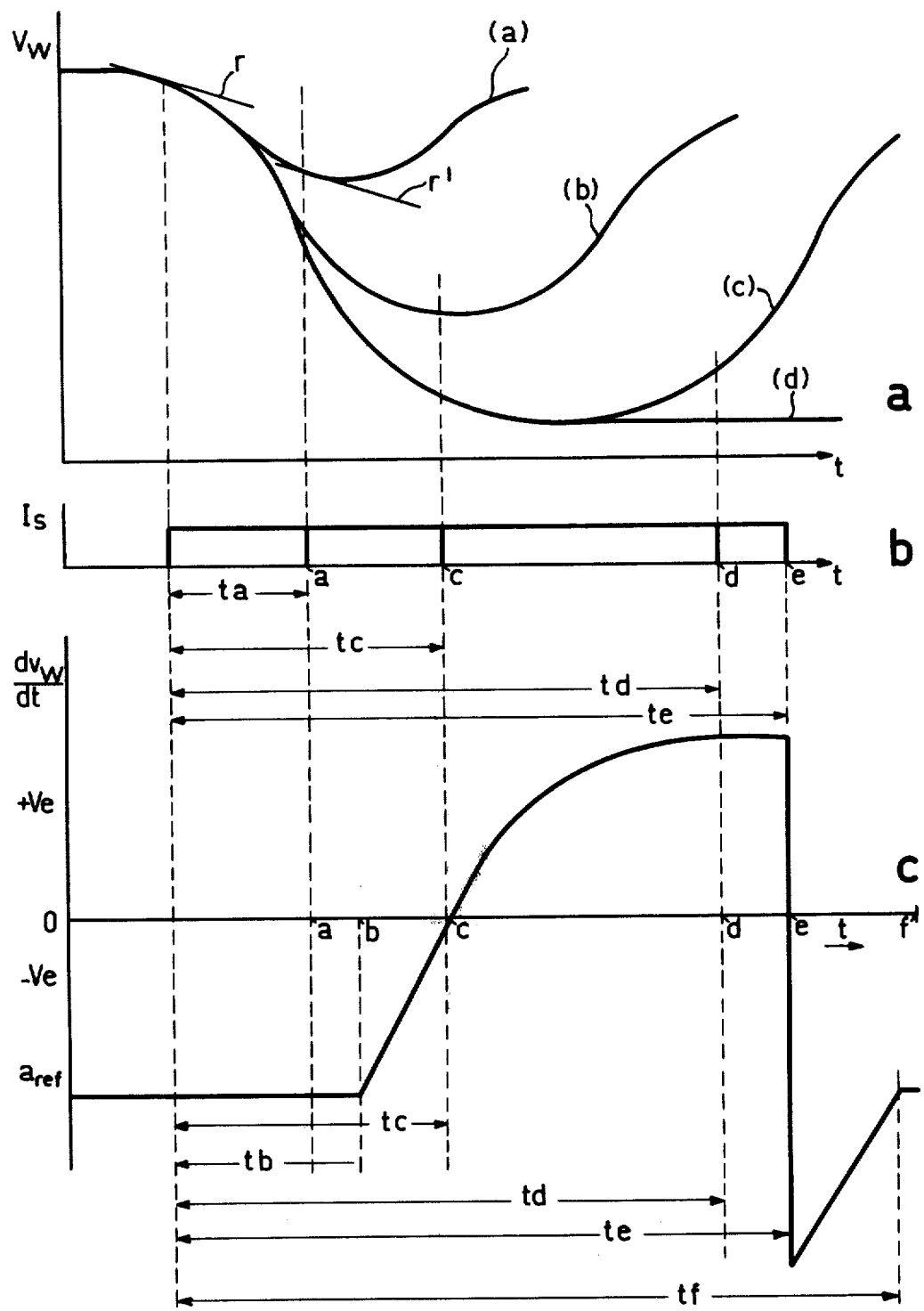

FIG. 4 comprises a sequence of circuits, which form a complete circuit diagram for the block diagram of FIG. 3. In this circuit diagram, the various elements are shown in dotted line blocks which correspond to the blocks of the block diagram of FIG. 3. The circuit element shown in the additional block SP at the left of FIG. 4 is simply a supply filter and voltage stabilizer for the rest of the circuit and provides a 6.8v stabilized voltage line from a 12v nominal supply voltage.

The input limiter/amplifier and monostable element LAM is of conventional structure. As aforesaid, it amplifies and limits the signal from the wheel pick-up PU to produce a pulse of substantially constant width, (approx. 200 μ sec) whenever the input voltage (frequency range 50Hz to 1 kHz) exceeds a pre-set positive value. The output pulse from the element LAM is fed to the pulse generator PG and also to the speed signal output element SS.

The pulse generator PG is of conventional structure. As aforesaid, its function is to produce an output pulse immediately after the pulse from the element LAM.

The waveform generator WG is of conventional structure, and its function, as aforesaid, is to shape the 1 m.sec pulse from the pulse generator PG, so that it is of a form suitable for the element SS.

The element SS effectively samples and holds the output from the generator WG just before it is reset, to produce a voltage whose value is a function of the input pulse frequency.

This is achieved as follows: in the element SS, a capacitor C1 stores the speed signal voltage. This voltage, plus the $V_{be}$ of a transistor T1, is also present at the emitter of this transistor T1, which is connected as an emitter follower, and also at the emitter of a transistor T2. The base of transistor T2 is connected to receive the output voltage from the waveform generator WG, and if this output voltage makes the base of transistor T2 more negative than its emitter, then this transistor T2 will start to conduct. This will cause a further transistor T3 to conduct to discharge capacitor C1, until the voltage on this capacitor, and thus the voltage at the emitter of transistor T2, is reduced sufficiently to render transistor T2 non-conductive. In this way the stored speed signal voltage varies with change in the output voltage from the waveform generator WG. Since this output voltage is reset to a maximum value at the beginning of each pulse from the pulse generator PG, and decays to a minimum value just before the next pulse, it has a value which is a function of the time between successive pulses. Therefore, it may be that only towards the end of the time between successive pulses from the waveform generator WG, the output voltage from the latter decays, sufficiently to render transistor T2 conductive. The charge on the capacitor C1 is replenished at the input pulse frequency by the pulse output from the element LAM, which is fed to this capacitor via lead PL1, resistor R1, capacitor C2 and diode D1. If the charge on the capacitor C1 is "pumped-up" to a too positive value, then transistor T2 will start to conduct to render transistor T3 conductive, and thereby reduce the capacitor charge until transistor T2 is turned-off again, and is thereafter dependent for its further conduction on the decaying voltage at its base. The resulting output voltage at the emitter of transistor T1 is shown in waveform diagram (a) of FIG. 6.

Turning now to the detector DD, under constant speed conditions, a transistor T4 therein is turned hard on by the current fed into its base over a lead L1 from the reference control element RC. The current needed by transistor T4 in order to bottom it is only a small part of that supplied, so that the performance of the circuit is relatively independent of the gain of the transistor. With transistor T4 bottomed, two further transistors T5 and T6 are both cut off and the voltage across a collector load resistor R2 of transistor T6 is zero.

Normally the voltage at the emitter of transistor T5 is the same as that at the base of transistor T4, because there is no current flowing in a resistor R3 which affords the black-lash delay referred to previously. In order for transistor T4 to be tuned off, and hence transistors T5 and T6 turned on, a current must flow in resistor R3 which is almost equal to the reference current supplied over lead L1, and so poled as to cause the base current of transistor T4 to be almost reduced to zero.

Figure 6A:
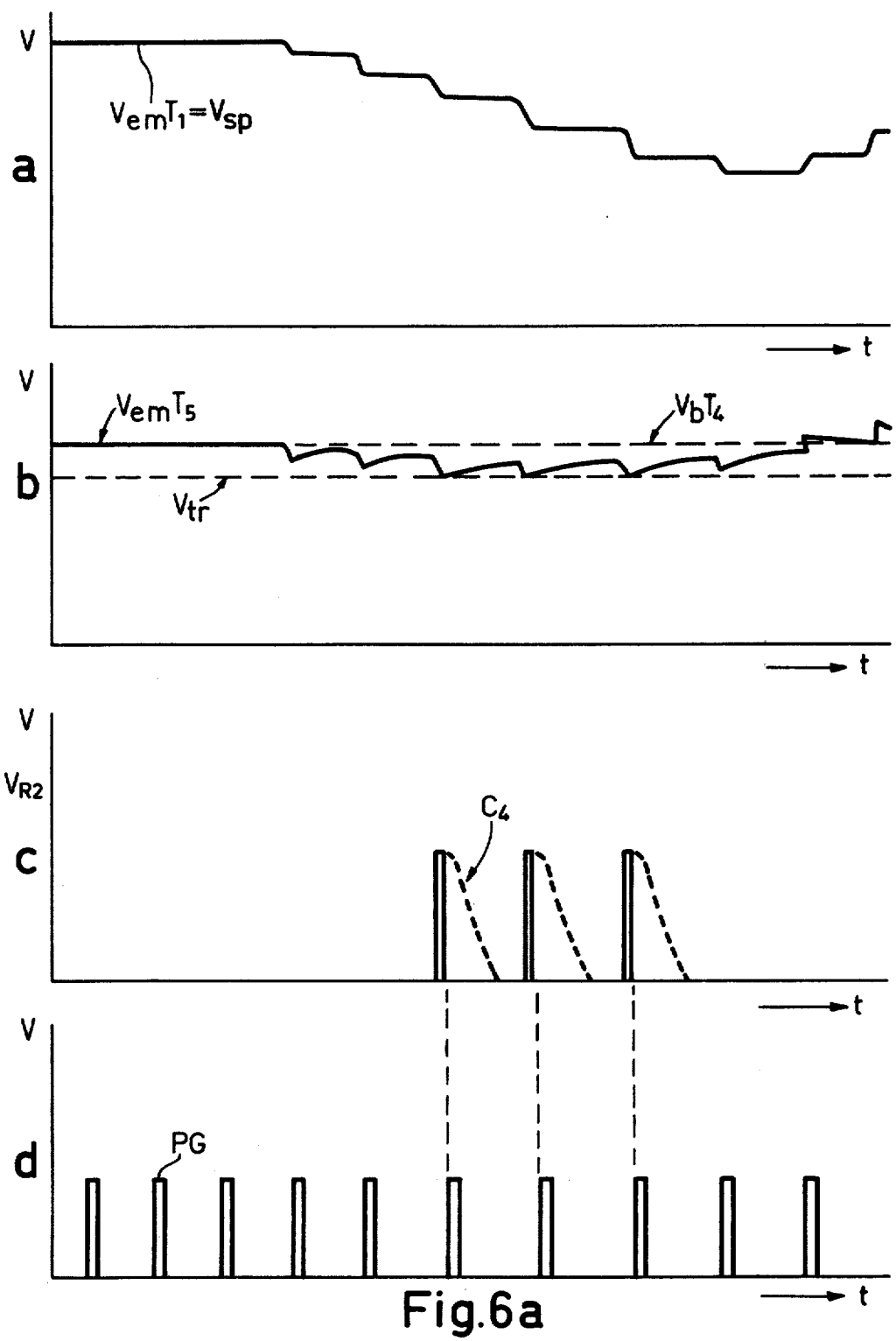

Waveform diagrams (a) to (d) of FIG. 6a represent the voltage waveforms which occur in the detector DD, when the road wheel exceeds the pre-set reference value of deceleration. Waveform diagram (a) represents, as aforesaid, the speed signal voltage that is applied to a differentiating capacitor C3 of the detector DD. It is assumed that initially the wheel is going at constant speed, then it decelerates at an ever increasing rate until it has exceeded the pre-set reference value, after which its deceleration falls to zero then turns into an acceleration (i.e., as illustrated in FIG. 5a).

Waveform diagram (b) of FIG. 6a shows the voltage that occurs at the junction of capacitor C3 and resistor R3, and at the emitter of transistor T5. While the wheel is going at a constant speed, the voltage at the above mentioned junction remains at the same value as the voltage at the base of transistors T4. The triggering level shown on waveform diagram (b) corresponds to the voltage which must be applied to resistor R3 in order to cause transistor T4 to turn off. Each time the speed signal voltage falls by a small step, then the same step is applied to the emitter voltage of transistor T5, as shown in waveform diagram (b). In between steps, when the speed signal remains constant, the voltage at the emitter of transistor T5 tends to return exponentially to the voltage at the base of transistor T4. If the size and frequency of the steps is sufficient, then the voltage will reach the triggering level and cause the transistor T4 to turn off. The collector voltage of transistor T4 will rise and cause transistor T5 to turn on. This prevents any further drop in the voltage applied to the emitter of transistor T5, so that the voltage will not be able to fall below the triggering level. The current that flows in transistor T5 at this time, causes transistor T6 to turn on and produce a pulse capable of driving the next stage.

At the end of the step in the speed signal, the voltage at the emitter of transistor T5 again tends to return exponentially towards the voltage at the base of transistor T4. Thus, if the next step is too small, because the reference rate is no longer being exceeded, then no further pulses will be generated.

The minimum voltage differential that can be permitted between the base voltage of transistor T4 and the triggering level voltage, is equal to the voltage step that occurs at the lowest operating speed, when the wheel is decelerating at the reference rate. A higher voltage differential can be selected in order to prevent the circuit from being triggered by false signals, which can be caused by oscillations in the vehicle suspension or by imperfections in the wheel transducer.

Waveform diagram (c) of FIG. 6a shows what the output from the detector DD across resistor R2 would be like, if a capacitor C4 were not connected across this resistor. It can be seen that the output pulse can be of very short duration, and that it occurs just before the pulses shown in waveform diagram (d) of FIG. 6a, which are the one millisecond pulses from the pulse generator PG. The pulse from the detector DD must overlap the leading edge of the pulse from the pulse generator PG. This is achieved by the addition of the capacitor C4, so that the pulse is lengthened as shown by the dotted line in waveform diagram (c).

The bistable element BE is of a conventional type arranged to be triggered into one state by the detector output, and into the other state by the leading edge of the pulse from the pulse generator PG.

The output of the bistable element BE is taken from the collector of a transistor T7 (FIG. 4). Normally, a second transistor T8 in the bistable element is triggered on, and transistor T7 is triggered off by the pulses from the pulse generator PG, which are applied to the bistable element over a pulse lead PL2. Transistors T7 and T8 stay in this state until the reference deceleration rate is exceeded. The detector DD then produces pulses which cause the state of the bistable to be reversed and transistor T7 turns on and transistor T8 turns off. The bistable is arranged so that the transistor T7 will only turn off again when the pulses from the detector DD cease.

Figure 6B:
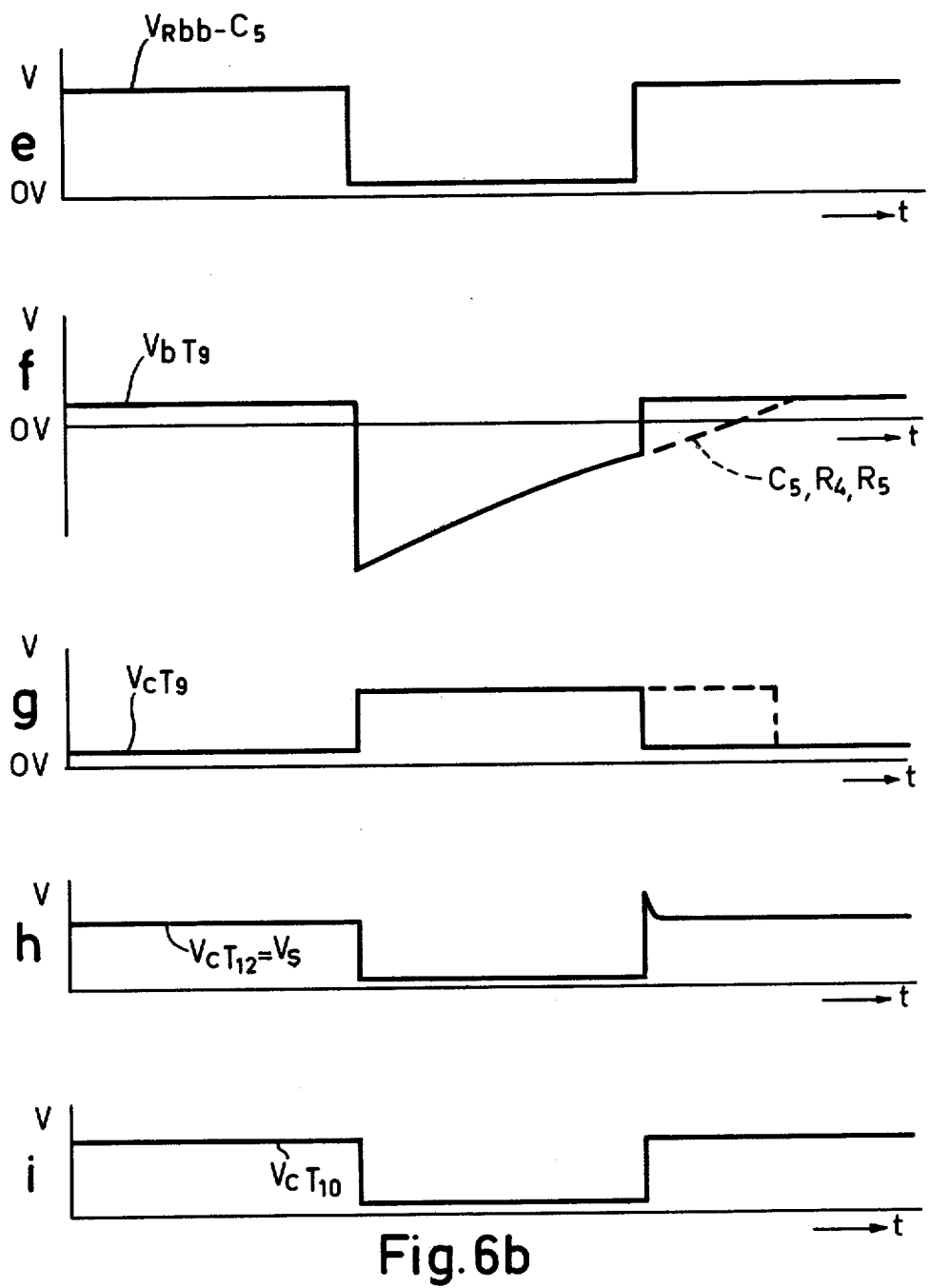

The output from the bistable element BE is applied to the automatic turn-off element AT. This output, which is represented in waveform diagram (e) of FIG. 6b, goes low when the detector DD detects a deceleration in excess of the reference rate. This causes a transistor T9 in the element AT to be turned off for a maximum time determined by a capacitor C5 and resistors R4 and R5. Waveform diagram (f) of FIG. 6b represents the voltage at the base of transistor T9 due to these components. Normally, the output from the bistable element BE will go high and cause transistor T9 to be turned on again before the end of the maximum time mentioned above.

When transistor T9 is turned off, its collector goes positive, as shown in waveform diagram (g) of FIG. 6b to turn on transistors T10, T11 and T12 of the power output stages POS. An output is taken from the collector of transistor T12 to effect solenoid energization, this output being represented by the waveform diagram (h) of FIG. 6b. An output is also taken from the collector of transistor T10 to the base of a transistor T13 in the reference control element RC, this output being represented by the waveform diagram (i) of FIG. 6b.

Figure 6C:
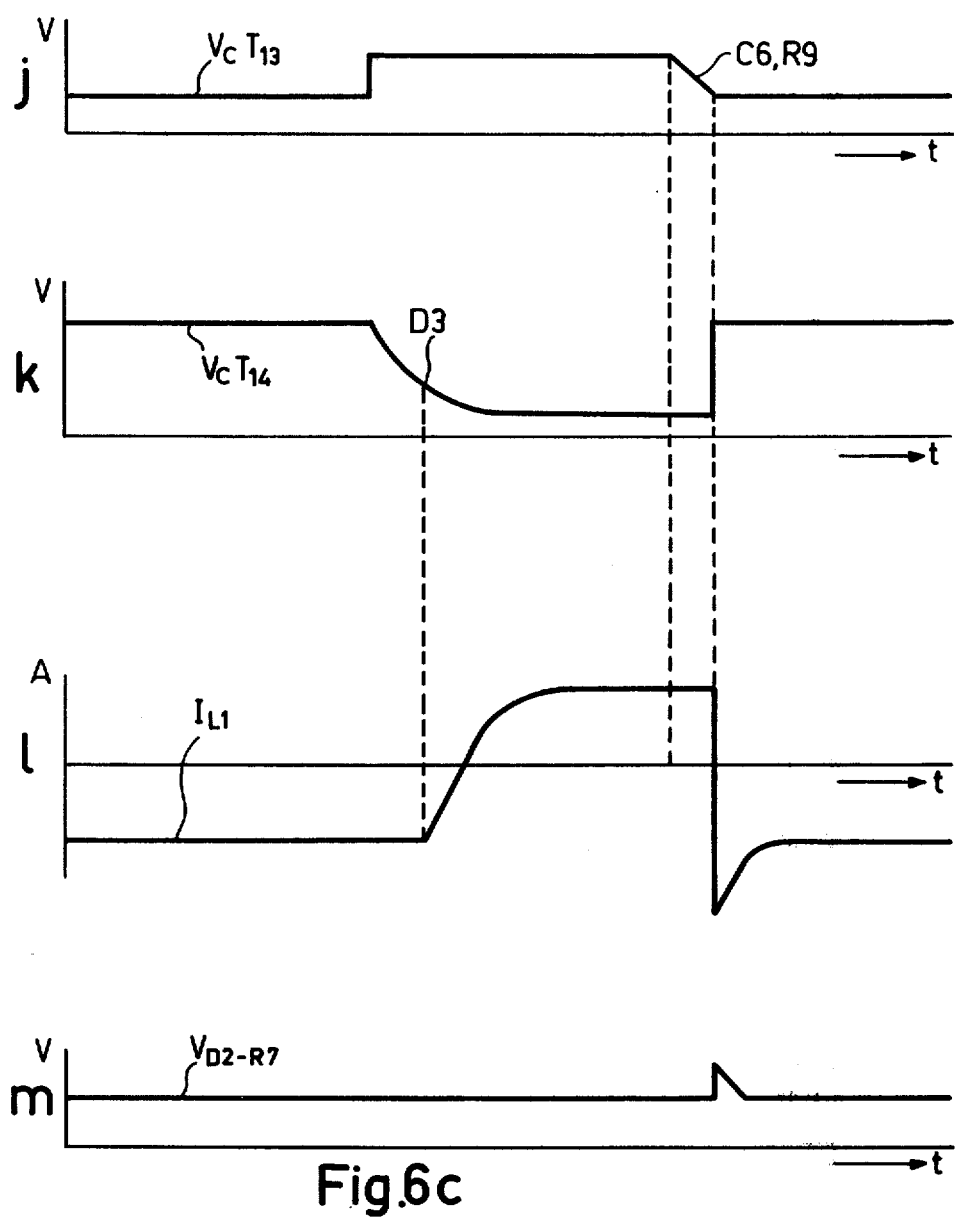

Transistor T13 is normally non-conductive, and is rendered conductive by the input to its base. The collector voltage of transistor T13 goes positive, thereby turning off a transistor T14 and rapidly discharging a capacitor C6 through the collector of transistor T13. Waveform diagram (j) of FIG. 6c represents the voltage at the collector of transistor T13. When transistor T14 is cut-off, a capacitor C7 discharges exponentially through a diode D2 and a resistor R6 and the voltage at the collector of transistor T14 falls exponentially as represented by the waveform diagram (k) of FIG. 6c. Eventually, a diode D3 starts to conduct. The lead L1 is normally maintained at approximately half the stabilized line voltage to supply the current which determines the initial reference rate of wheel deceleration. However, when diode D3 starts to conduct, a current flows through resistors R7 and R8 which opposes the reference current, and as capacitor C7 is progressively discharged, the current in lead L1 changes progressively from a negative sense to a positive sense, as represented by the waveform diagram (l) of FIG. 6c, thereby progressively varying the reference rate of wheel deceleration in a positive sense.

When the output from the output stage POS is terminated, transistor T13 is turned off again, but transistor T14 is not turned on again until after a delay which is determined by the time constant of capacitor C6 and a resistor R9, as shown in waveform diagram (j). When transistor T14 turns on, the sudden change in voltage across capacitor C7 backs-off diode D2, as represented by the waveform diagram (m) of FIG. 6c, which causes a sudden reversal in the polarity of the reference current in lead L1. The reference current in lead L1, thereafter restores exponentially to its initial reference value as capacitor C7 recharges through a resistor R10, until diode D2 becomes forward biassed again.

Suitable components, and component values for the circuit diagram of FIG. 4 are as follows, for a road wheel diameter of 2 feet having a transducer toothed ring rotatable therewith which has 60 teeth/revolution. A typical output voltage from the magnetic pick-up would be 1 volt peak at 100 cps (7 m.p.h.) and 10 volts peak at 1,000 cps approx. (70 m.p.h.).

| Resistors | | |
| --- | --- | --- |
| R1 - 2.2 kΩ | Rd - 220 KΩ | Rq - 100 KΩ |
| R2 - 100 kΩ | Re - 47 KΩ | Rr - 1 KΩ |
| R3 - 22 KΩ | Rf - 39 KΩ | Rs - 47 KΩ |
| R4 - 330 KΩ | Rg - 1.5Ω | Rt - 470 KΩ |
| R5 - 330 KΩ | Rh - 220 KΩ | Ru - 10 KΩ |
| R6 - 100 KΩ | Ri - 100Ω | Rv - 1 KΩ |
| R7 - 470 KΩ | Rj - 82 KΩ | Rw - 470 KΩ |
| R8 - 100 KΩ | Rk - 100 KΩ | Rx - 8.2 KΩ |
| R9 - 560 KΩ | Rl - 1.5 KΩ | Ry - 100 KΩ |
| R10 - 100 KΩ | Rm - 100 KΩ | Rz - 100 KΩ |
| Ra - 1 KΩ | Rn - 392 KΩ | |
| Rb - 22 KΩ | Ro - 100 KΩ | |
| Rc - 68 KΩ | Rp - 390 KΩ | |
| Raa - 10 KΩ | Rhh - 330Ω | |
| Rbb - 10 KΩ | Rii - 150Ω | |
| Rcc - 100 KΩ | Rjj - 10 KΩ | |
| Rdd - 100 KΩ | Rkk - 10 KΩ | |
| Ree - 10 KΩ | Rll - 100 KΩ | |
| Rff - 100 KΩ | Rmm - 150Ω | |
| Rgg - 4.7 KΩ | | |

| Capacitors | | Transistors | |
| --- | --- | --- | --- |
| C1 - 0.47 | μF | T1 - BCY71 | (Mullard) |
| C2 - 0.022 | do. | T2 - do. | do. |
| C3 - 2.2 | do. | T3 - BC108 | do. |
| C4 - 0.022 | do. | T4 - do. | do. |
| C5 - 2.2 | do. | T5 - do. | do. |
| C6 - 0.22 | do. | T6 - BCY71 | do. |
| C7 - 0.47 | do. | T7 - BC108 | do. |
| Ca - 0.47 | do. | T8 - do. | do. |
| Cb - 0.1 | do. | T9 - do. | do. |
| Cc - 0.22 | do. | T10 - do. | do. |
| Cd - 0.047 | do. | T11 - BFX85 | do. |
| Ce - 0.022 | do. | T12 - BDY20 | do. |
| Cf - 0.047 | do. | T13 - BCY71 | do. |
| Cg - 0.022 | do. | T14 - BCY71 | do. |
| Ch - 0.22 | do. | Ta - BC108 | do. |
| | | Tb - do. | do. |
| | | Tc - do. | do. |

| Diodes | | | |
| --- | --- | --- | --- |
| D1 - OA202 | (Mullard) | Df - OA202 | (Mullard) |
| D2 - do. | do. | Dg - do. | do. |
| D3 - do. | do. | Dh - do. | do. |
| Da - BZY88C6V8 | do. | Di - do. | do. |
| Db - BA148 | do. | Dj - do. | do. |
| Dc - OA202 | do. | Dk - do. | do. |
| Dd - do. | do. | Dl - do. | do. |
| De - do. | do. | | |

Instead of using discrete components for the circuit of FIG. 4, this circuit may be formed as an integrated circuit, for example as a thin film integrated circuit mounted with transistor chips.

I claim:

1. An electronic control system for an anti-lock vehicle brake system containing at least one brake, said control system being responsive to an input signal from a wheel movement sensor associated with a wheel of said vehicle system, which measures change in wheel speed, said signal varying in accordance with the rate of said speed change, said electronic control system comprising:

a solenoid valve mechanism connected to a brake of said anti-lock system for reducing brake pressure of said brake when braking takes place and wheel deceleration exceeds a reference value;

a control circuit connected to said wheel movement sensor and to said solenoid valve mechanism and having a reference control circuit therein, said reference control circuit being responsive on energisation of said solenoid valve mechanism by said control circuit for progressively varying said reference value in a positive sense at a predetermined rate, said solenoid valve mechanism being held energized by said control circuit until the rate of change of said wheel speed bears a given relationship to said varying reference value.

2. The electronic control system of claim 1, further comprising a delay device connected to said reference control circuit for maintaining said reference value in an unchanged capacity for a given time after energization of said solenoid valve mechanism, said reference control circuit then being operable after said given time to change said reference value progressively in a positive sense if the wheel deceleration remains in excess of said reference value.

3. The electronic control system of claim 2, wherein said delay device comprises a monostable circuit.

4. The electronic control system of claim 1, further comprising a delay device connected to said reference control circuit for increasing the reference value of the wheel deceleration for a given time, to a new, more negative value immediately after energization of said solenoid valve mechanism, said reference control circuit being operable after said given time if the wheel deceleration remains in excess of the new reference value.

5. The electronic control system of claim 1, further comprising reset means connected to said reference control circuit for setting said reference value to a higher deceleration value for a given time at termination of anti-lock braking control action, and prior to resetting said reference value to an original rate commensurate with a beginning of said anti-lock braking control action.

6. The electronic control system of claim 1, further comprising reset means connected to said reference control circuit for setting said reference value to a lower acceleration value for a given time at termination of anti-lock braking control action, and prior to resetting said reference value to an original rate commensurate with a beginning of said anti-lock brake control action.

7. The electronic control system of claim 1, further comprising timing means connected to said solenoid valve mechanism for automatically terminating anti-lock braking control action after a predetermined time.

8. The electronic control system of claim 7, wherein said timing means comprises a monostable circuit.

9. The electronic control system of claim 1, wherein said control circuit comprises:
   an input terminal for said wheel speed signal;
   a transistor having a base portion, an emitter portion and a collector portion;
   a capacitor connected between said input terminal and the base portion of said transistor;
   a source of fixed potential;
   a resistor connected between said source of fixed potential and the base portion of said transistor, resulting base current determining said reference value;
   an output stage connected to said transistor and to said solenoid valve mechanism for supplying current to said solenoid valve mechanism if said transistor in common emitter connection passes no current;
   an input for said reference control circuit connected to said output stage; and
   an output for said reference control circuit connected to the base portion of said transistor.

10. The electronic control system of claim 9, wherein said control circuit further comprises a resistor connected between the base portion of said transistor and said capacitor, and transistor cut off means, said resistor for setting a fixed amount of wheel speed which must be exceeded after wheel deceleration has exceeded said reference value before said transistor is cut-off.

11. The electronic control system of claim 9, wherein said control circuit further comprises:
   a source of positive voltage;
   a resistor connected between said positive voltage source and the collector portion of said transistor, said collector portion supplying a control signal to said output stage;
   a null line; and
   a voltage divider connected between the source of positive voltage and said null line, said voltage divider having a junction point connected to the emitter portion of said transistor.

12. The electronic control system of claim 11, further comprising a delay circuit and a reset circuit connected to said reference control circuit, said delay, reset, and reference control circuits formed by a second transistor having a base portion, an emitter portion and a collector portion, said emitter portion of said second transistor being connected to the positive voltage source, said collector portion of said second transistor being connected to said null line through a resistor, and said base portion of said second transistor connected to said output stage, said second transistor being saturated when said output stage passes no current and being cut off when said output stage passes current;
   a resistor-capacitor network connected to said second transistor, said network comprising a first diode having an anode connected to the positive voltage source, and a cathode connected through a resistor wired in parallel with said diode, to a capacitor connected to said collector portion of said second transistor;
   a second resistor connected to the base portion of said former transistor; and
   a third resistor and a second diode in series connected between said second resistor and base portion connection and the collector portion of said former transistor, said series resistor-diode combination passing current toward said former collector portion.

* * * * *